(12) United States Patent
Chang

(10) Patent No.: US 7,728,787 B2
(45) Date of Patent: Jun. 1, 2010

(54) 3D DISPLAY DEVICE AND AN ELECTRONIC DEVICE WITH THE SAME

(75) Inventor: Jen-Tsorng Chang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1128 days.

(21) Appl. No.: 11/325,395

(22) Filed: Jan. 4, 2006

(65) Prior Publication Data

US 2006/0152433 A1    Jul. 13, 2006

(30) Foreign Application Priority Data

Jan. 7, 2005    (CN) .................. 2005 1 0032758

(51) Int. Cl.
G09G 5/00    (2006.01)
(52) U.S. Cl. ................... 345/1.1; 345/1.2; 345/1.3
(58) Field of Classification Search ................ 345/156, 345/168–169, 173, 179, 1.1–2.2, 901, 902–903, 345/905; 455/560, 566, 575.1, 575.3, 575.4; 361/679–681; 379/428.03, 428.04, 433.13
See application file for complete search history.

(56) References Cited

U.S. PATENT DOCUMENTS

| | | | |
|---|---|---|---|
| 5,949,643 A * | 9/1999 | Batio ........................ 361/681 |
| 6,931,265 B2 * | 8/2005 | Reyes et al. ................. 455/566 |
| 7,061,754 B2 * | 6/2006 | Moscovitch ................. 361/683 |
| 7,092,247 B2 * | 8/2006 | Kim ....................... 361/679.04 |
| 7,138,962 B2 * | 11/2006 | Koenig ........................ 345/1.3 |
| 7,283,852 B2 * | 10/2007 | Fagerstrom .............. 455/575.1 |
| 7,411,636 B2 * | 8/2008 | Abileah ....................... 349/15 |

FOREIGN PATENT DOCUMENTS

| | | |
|---|---|---|
| CN | 2388619 Y | 7/2000 |
| CN | 1359240 A | 7/2002 |

* cited by examiner

Primary Examiner—Richard Hjerpe
Assistant Examiner—Mansour M Said
(74) Attorney, Agent, or Firm—Jeffrey T. Knapp

(57) ABSTRACT

A 3D display device includes two display portions (200, 201) each having a display for generating a particular image thereon. The two display portions are substantially symmetrically arranged. Images associated with the two display portions are slightly different from each other. An electronic device includes a main body (10) and an above-described display device (20). The display device is rotatably connected to the main body. The 3D display device and the electronic device with the 3D display device can provide 3D images directly and also provide 2D images to with a person via a naked eye. In addition, the 3D display device and the electronic device are very simple in construction and easily manufactured.

5 Claims, 3 Drawing Sheets

3D DISPLAY DEVICE AND AN ELECTRONIC DEVICE WITH THE SAME

BACKGROUND OF THE INVENTION

1. Field of the Invention

The present invention generally relates to display devices and, more particularly, to a 3D (three-dimensional) display device and an electronic device with the display.

2. Discussion of the Related Art

With the rapid development of communication technology, mobile phones have become a commonplace communication tool in the life of people, as a whole. Nowadays, more and more mobile phones have color displays and deliver multimedia messages. As a result, high-quality imaging systems, which can clearly and realistically display images and/or messages, should, advantageously, be provided. A system which can display 3D images has the potential to be popular with consumers since most present-day displays are limited to 2D (two-dimensional).

A person's two eyes can see objects respectively. Because there is a distance between the two eyes, images of an object that are perceived in the two eyes are slightly different. This difference in the perceived images is called parallax. The brain of a person combines the two different images, thereby generating a composite 3D image. That is, the person sees a 3D object.

In conjunction with the above theory, 3D shutter glasses have been produced and made available. A controller controls signals, which are sent to a display of a computer or a mobile phone. Left eye signals and right eye signals are sent alternately so that the display generates left eye images and right eye images accordingly. Correspondingly, shutters of the 3D shutter glasses are controlled to selectively cover the left eye and right eye, respectively. Thereby, the left eye sees the left images and the right eye sees the right images, alternately. People can see/perceive 3D images for persistence of vision. There are some shortcomings with such a shutter system. Firstly, it is inconvenient to wear the 3D shutter glasses. Secondly, people without 3D shutter glasses would tend to see ghost images on the display, which would appear abnormal.

What is needed, therefore, is a display device, which can provide 3D images and 2D images directly to people with the naked eye.

SUMMARY OF THE INVENTION

A 3D display device includes two display portions each capable of generating an image. The two display portions are symmetrically arranged. Images displayed by each of the two display portions are slightly different.

An electronic device includes a main body and a display device. The display device includes two display portions, each configured for generating a separately controllable image. The two display portions are symmetrically arranged, and the display device, as a whole, is rotatably connected to the main body. Images displayed by each of the two display portions are slightly different.

The 3D display device and the electronic device with the 3D display device can provide 3D images directly and also provide 2D images to people with the naked eye. Therefore, it is very convenient. In addition, the 3D display device and the electronic device are very simple and are easily manufactured.

Other advantages and novel features of preferred embodiments of the present 3D display device will become more apparent from the following detailed description when taken in conjunction with the accompanying drawings.

BRIEF DESCRIPTION OF THE DRAWINGS

Many aspects of the electronic device with a 3D display can be better understood with reference to the following drawings. The components in the drawings are not necessarily to scale, the emphasis instead being placed upon clearly illustrating the principles of the electronic device with a 3D display. Moreover, in the drawings, like reference numerals designate corresponding parts throughout the several views.

DETAILED DESCRIPTION OF PREFERRED EMBODIMENTS

Figure 1:
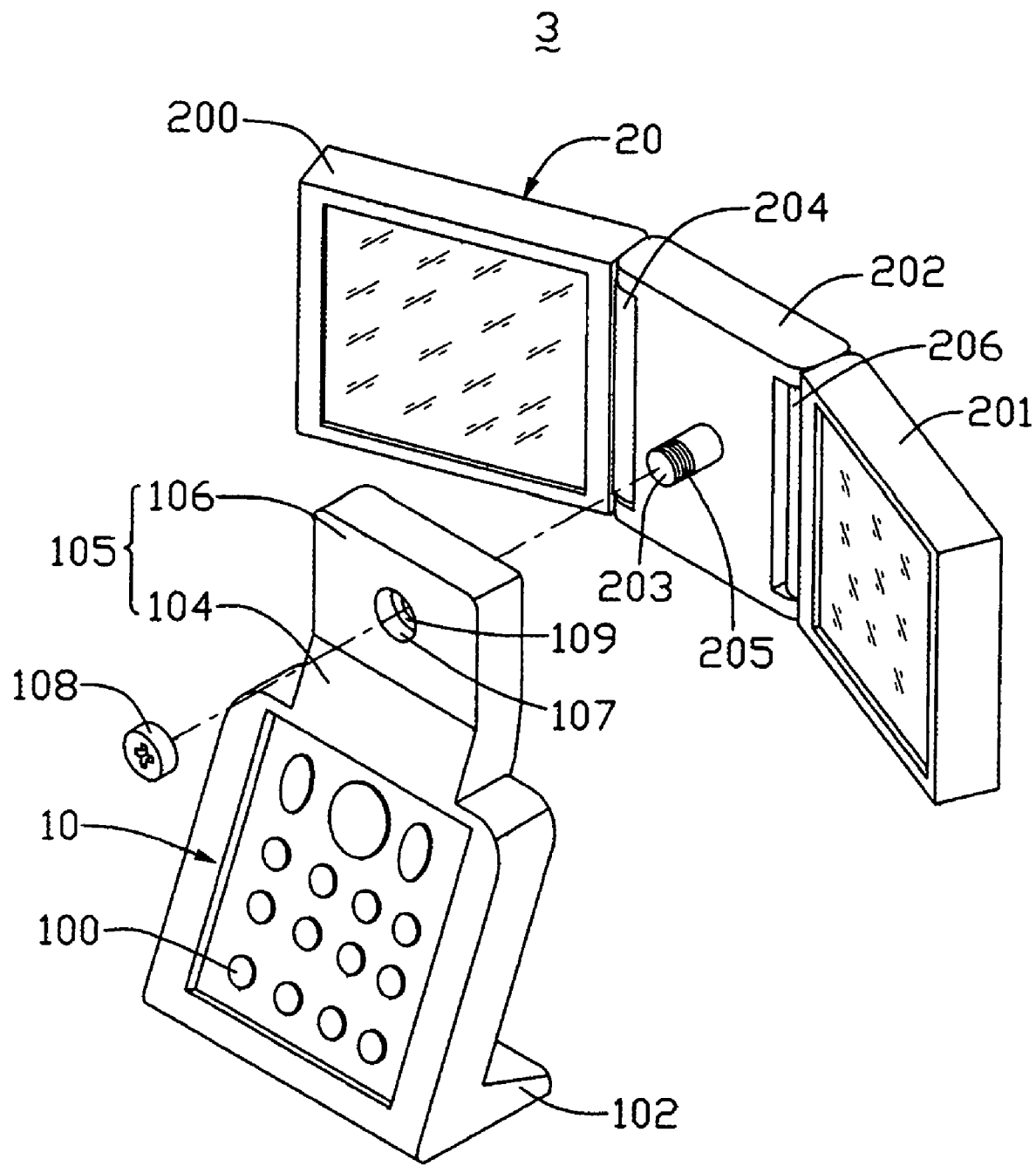
FIG. 1 is an exploded, isometric view of an electronic device with a 3D display, in accordance with a preferred embodiment.

A 3D display is shown and detailed as follows for the purposes of providing a simple description of the preferred embodiment. The present 3D display and embodiments thereof are not to be construed as being limited to the following description. Referring to FIG. 1, a mobile phone 3 includes a main body 10 and a display device 20.

The main body 10 includes a keypad portion 100, a base portion 102, a connecting portion 104, an extending portion 106, and a nut 108. With a plurality of keys (not labeled) thereon, the keypad portion 100 is approximately cuboid-shaped (i.e., approximately a rectangular parallelepiped). The base portion 102 is formed at one end of the keypad portion 100 for supporting the mobile phone 3. The connecting portion 104 is formed at another end of the keypad portion 100, opposite to the base portion 102. The extending portion 106 is approximately cuboid-shaped. The extending portion 106 is connected to the keypad portion 100 by the connecting portion 104. The connecting portion 104 and the extending portion 106 together can be considered to constitute a connective unit 105, allowing the display device 20 to be mounted relative to the keypad portion 100/main body 10. The keypad portion 100 is upward sloping, and the extending portion 106 is vertical relative to the base portion 102. A through hole 107 is defined substantially centrally in the extending portion 106. The through hole 107 has two sections with different diameters, and a step 109 is formed at the joint of the two sections. The nut 108 defines a "+" shaped slot (not labeled) in one face thereof and a hole (not shown) in the center of the opposing face. The "+" shaped slot is configured for receiving a Phillips screw driver head and/or a flat screw driver head. Alternately, the slot could be shaped solely for receiving a flat screw driver head. The nut 108 has a screw thread in the hole.

The display device 20 includes a first display portion 200, a second display portion 201, and a middle portion 202. The middle portion 202 is a rectangle-shaped board. A columnar pole or post 203 is formed on the middle portion 202 in the center thereof. The outside wall of the pole 203 has a screw thread 205 on an end thereof opposite the middle portion 202. The pole 203 is inserted into the nut 108 and engages with the nut 108 by the mating screw threads. Each of the first display portion 200 and the second display portion 201 has a display and a microlens array (not shown). The first and second display portions 200, 201 are connected to two opposite ends/sides of the middle portion 202 by a first hinge 204 and a second hinge 206, respectively. The first and second display portions 200, 201 are separately rotatable relative to the middle portion 202, and can rest at any position, within angular limits of hinges 204, 206, respectively. The microlens arrays are used to focus incidence lights of the displays of the first and second display portion 200, 201 in order that lights which should enter the left eye do not enter the right eye and lights which should enter the right eye do not enter the left eye.

In assembly, the pole 203 of the display device 20 is inserted into the through hole 107 of the main body 10, and the display device 20 is assembled onto the main body 10. Then, the nut 108 is screwed on the pole 203 of the display device 20. The step 109 of the main body 10 stops the nut 108 from protruding further into the main body 10 from a side thereof, next to the display device 20. Thereby, the display device 20 is connected to the main body 10, and the display device 20 is rotatably connected relative to the main body 10 along an axis of the pole 203.

Figure 2:
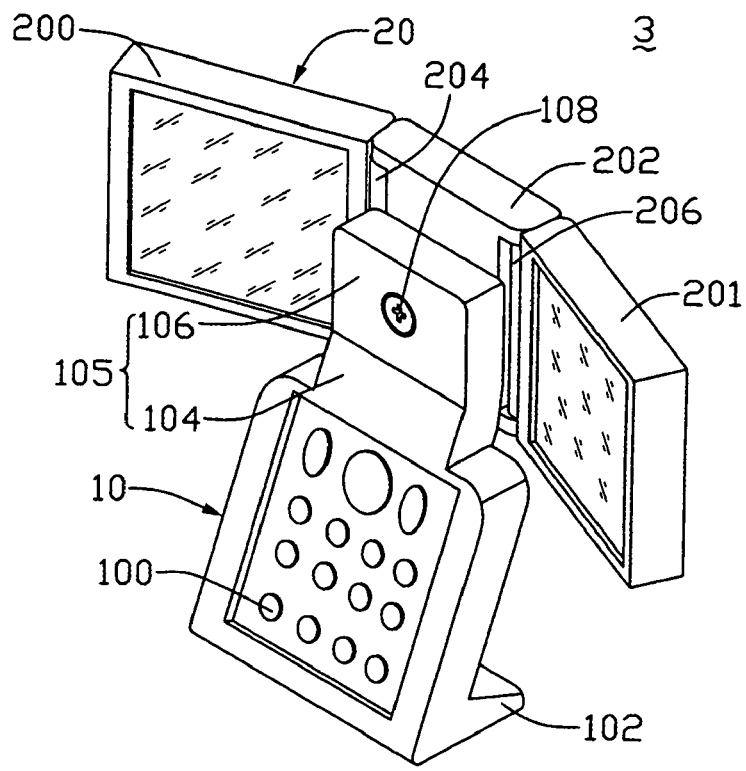
FIG. 2 is an assembled, isometric view of the electronic device with a 3D display of FIG. 1, showing one state.

Referring to FIG. 2, the first and second display portions 200, 201 are positioned substantially symmetrically at two sides of the middle portion 202, and an obtuse angle (advantageously 140°~175°) exists between the middle portion 202 and both the first and second display portions 200, 201. Accordingly, the first and second display portions 200, 201 are also at an obtuse angle relative to one another, beneficially 130°~170°. The main body 10 is centrally below the first and second display portions 200, 201 (i.e., directly below the middle portion 202). In this state, a person's two eyes correspond to the first and second display portions 200, 201, respectively. Therefore, the left eye tends to see images of the second display portion 201 predominantly, if not only, and the right eye tends to see images of the first display portion 200 predominantly, if not only, when a distance between the eyes and the respective displays is appropriate. Specifically, there is an angular preference for one eye to see one of portions 200, 201 significantly better than the other. For example, when the display portions 200, 201 are obtusely angled in the manner shown, one's right eye will be able to see the left or first display portion 200 much more directly and thus more clearly than the second display portion 201. The images generated on the first and second display portion 200, 201 are slightly different with respect to each other. The images displayed by each are individually controlled by a controller (not shown) in the mobile phone 3. As such, the left and right eyes see different images, respectively. Thus, a person will see 3D images by management in his or her brain.

Figure 3:
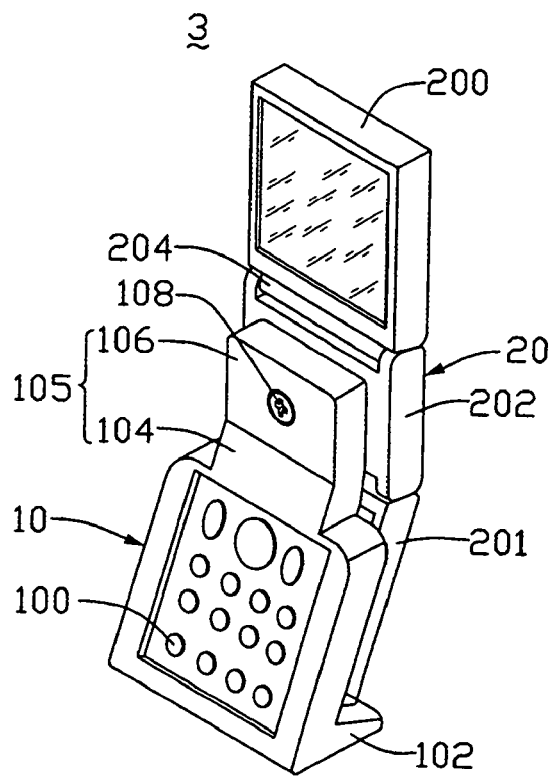
FIG. 3 is similar to FIG. 2, but shows another state with the display portion rotated 90° relative to the state seen in FIG. 2.

Referring to FIG. 3, when the display device 20 rotates 90° relative to the main body 10 and the first display portion 200 accordingly rotates to a position above the middle portion 202, the second display portion 201 becomes hidden behind the main body 10. The angle between the first display portion 200 and the back (not labeled) of the middle portion 202 is 180°. The mobile phone 3 shown in FIG. 3 is rotated counterclockwise an angle of 90°. In this state, people can see 2D images on the display of the first display portion 200 as usual.

Figure 4:
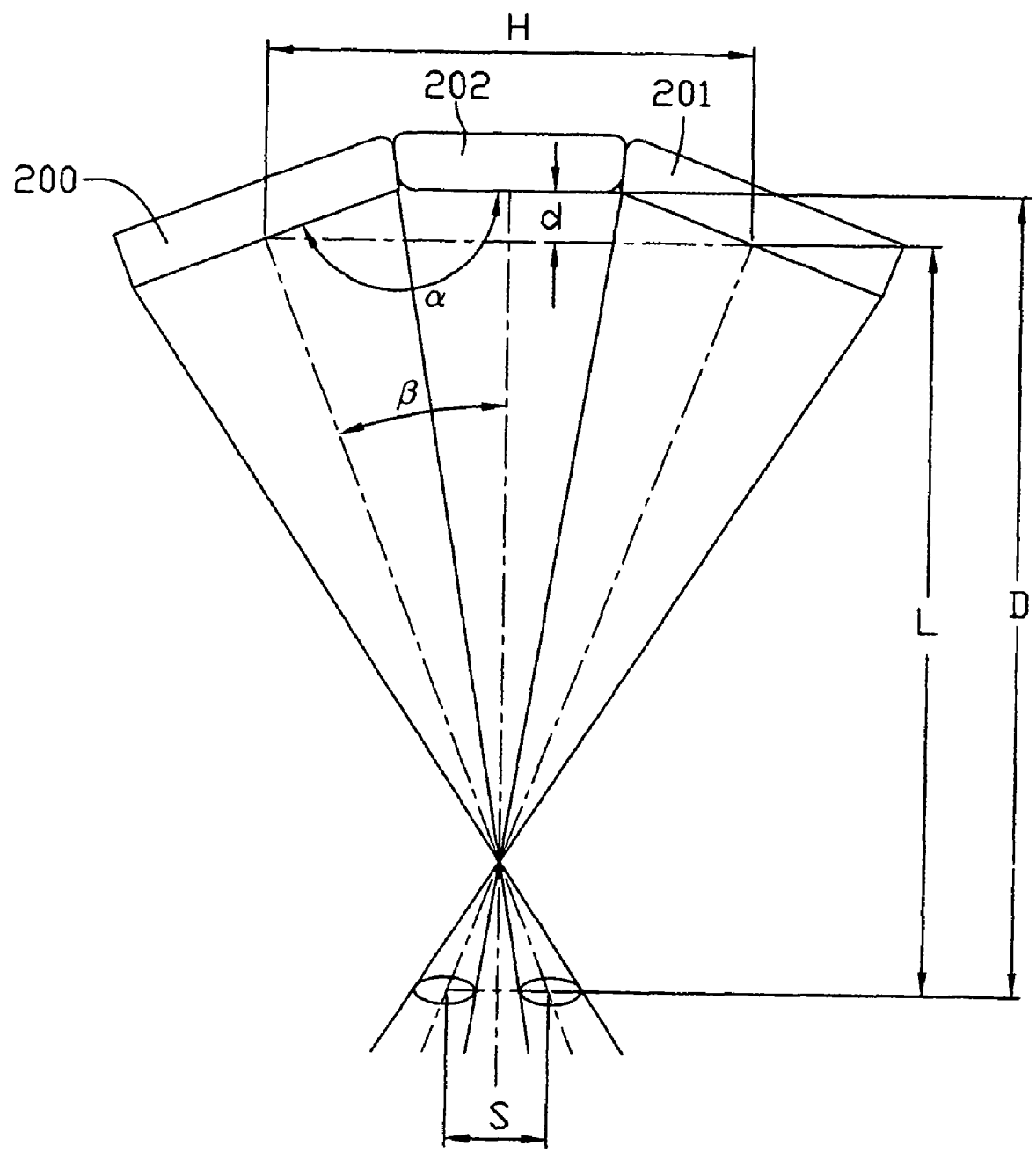
FIG. 4 is a top view imaging schematic, employing the 3D display of FIG. 2.

Referring to FIG. 4, an angle between the middle portion 202 and each of the first and second display portions 200, 201 is "α", a distance of centers of the first and second display portions 200, 201 is "H", and a distance between the centers of two corresponding eyes is "S". An appropriate distance between the eyes and the displays is "D" when the left eye sees images of the second display portion 201 only and the right eye sees images of the first display portion 200 only. It can be inferred that:

$$\beta = 180° - \alpha, \quad (1);$$

$$L = H/(2tg\beta) + S/(2tg\beta), \quad (2);$$

$$L = H/(2tg(180° - \alpha)) + S/(2tg(180° - \alpha)), \quad (3); \text{ and}$$

$$D = L + d = H/(2tg(180° - \alpha)) + S/(2tg(180° - \alpha)) + d. \quad (4).$$

"H", "S", "α" and "d" are determined by the structure of the display device 20. Therefore, if only a distance between the eyes and displays "L" satisfies the formula (4), people can see 3D images. Accordingly, if people want to see 3D images at a different distance "D", they can change the angle "α" to accomplish such viewing.

In an alternative embodiment, the first and second display portions 200, 201 and the middle portion 202 could be integrated into one, allowing the first and second hinges to be omitted. The base portion 102 could also be omitted.

It is believed that the embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. An electronic device comprising:
   a main body including a keypad portion and a connective unit, the connective unit including a connecting portion and an extending portion, the connecting portion being formed at one end of the keypad portion to interconnect the keypad portion and the extending portion, the connective unit having a through hole defined therein; and
   a display device comprising two display portions and a middle portion, the middle portion connecting the two display portions, the extending portion having the display device mounted thereto, the middle portion of the display device having a post on one side thereof, the post extending through the through hole in the connective unit, the display device thereby being rotatably connected relative to the connective unit via the post;
   wherein the two display portions are substantially symmetrically arranged and the display device is rotatably connected, as a whole, relative to the main body, the images generated by the two respective display portions being slightly different relative to one another and produce a 3D image for the viewer.

2. The electronic device as claimed in claim 1, wherein the extending portion has a through hole defined therein, and the through hole has two sections with different diameters, the two sections thereby forming a step.

3. The electronic device as claimed in claim 1, wherein the display device further comprises two hinges configured for rotatably connecting the two respective display portions to the middle portion.

4. The electronic device as claimed in claim 1, wherein the post is threadedly held in position relative to the connective unit with a nut.

5. The electronic device as claimed in claim 1, wherein the display device can rest in at least two positions relative to the main body, a first position being defined such that the main body is located centrally between and below the two display portions, the second position being such that the main body hides one of the two display portions.

* * * * *